(12) United States Patent
Durtschi et al.

(10) Patent No.: US 7,619,523 B2
(45) Date of Patent: Nov. 17, 2009

(54) GAS CYLINDERS MONITORING BY WIRELESS TAGS

(75) Inventors: Franck-Stephane Durtschi, Bear, DE (US); Thomas Parias, Croisy-sur-Seine (FR)

(73) Assignee: American Air Liquide, Inc., Fremont, CA (US)

( * ) Notice: Subject to any disclaimer, the term of this patent is extended or adjusted under 35 U.S.C. 154(b) by 293 days.

(21) Appl. No.: 11/778,483

(22) Filed: Jul. 16, 2007

(65) Prior Publication Data

US 2008/0084306 A1      Apr. 10, 2008

Related U.S. Application Data

(60) Provisional application No. 60/826,792, filed on Sep. 25, 2006.

(51) Int. Cl.
*G08B 13/14* (2006.01)

(52) U.S. Cl. ..................... 340/572.1; 705/28

(58) Field of Classification Search .............. 340/572.1, 340/573.1, 505, 539.1, 568.1; 705/22, 23, 705/28

See application file for complete search history.

(56) References Cited

U.S. PATENT DOCUMENTS

| | | | |
|---|---|---|---|
| 5,505,092 | A | 4/1996 | Kowalski |
| 5,883,305 | A | 3/1999 | Jo et al. |
| 6,252,510 | B1 | 6/2001 | Dungan |
| 6,598,454 | B2 | 7/2003 | Brazier et al. |
| 6,624,760 | B1 | 9/2003 | Kinzel et al. |
| 6,670,887 | B2 | 12/2003 | Dungan |
| 6,701,776 | B2 | 3/2004 | Stetter |
| 6,741,174 | B2 | 5/2004 | Rhoades et al. |
| 6,989,751 | B2 | 1/2006 | Richards |
| 2004/0007302 | A1 | 1/2004 | Hamilton et al. |
| 2007/0008152 | A1* | 1/2007 | Parias ............ 340/573.1 |
| 2007/0046466 | A1* | 3/2007 | Sakama et al. ...... 340/572.1 |
| 2007/0257498 | A1* | 11/2007 | Swain ............ 294/27.1 |
| 2008/0150739 | A1* | 6/2008 | Gamard .......... 340/626 |
| 2008/0195517 | A1* | 8/2008 | Minerley ............ 705/35 |

FOREIGN PATENT DOCUMENTS

| | | |
|---|---|---|
| EP | 0860648 | 8/1998 |
| EP | 0992017 | 4/2000 |
| EP | 1054363 | 11/2000 |
| EP | 1172758 | 1/2002 |
| EP | 1260756 | 11/2002 |

(Continued)

*Primary Examiner*—John A Tweel, Jr.
(74) *Attorney, Agent, or Firm*—Donna Blalock Holguin; Christopher J. Cronin (57) ABSTRACT

Embodiments of the present invention generally provide methods and systems for managing gas cylinders by using radio-frequency identification (RFID) technology. In one embodiment, each gas cylinder includes a RFID transponder configured to transmit a RFID signal. The RFID signal may include an identifier for the gas cylinder, as well as data such as gas pressure, temperature, flow rate, battery level, etc. The RFID signals are received by RFID receivers, and are transmitted to a server (e.g., via a computer network). In one embodiment, the gas cylinder data received by the server is collected in a database, and thereafter used by a gas cylinder management software application. The gas cylinder management application performs tasks including selectively generating alarms, locating specific gas cylinders, and replenishment of gas supplies.

37 Claims, 8 Drawing Sheets

FOREIGN PATENT DOCUMENTS

| | | |
|---|---|---|
| EP | 1271113 | 1/2003 |
| WO | WO0169340 | 9/2001 |
| WO | WO02066366 | 8/2002 |
| WO | WO02090899 | 11/2002 |
| WO | WO03088508 | 10/2003 |
| WO | WO03089853 | 10/2003 |
| WO | WO03098908 | 11/2003 |
| WO | WO03100740 | 12/2003 |
| WO | WO2004019559 | 3/2004 |

* cited by examiner

GAS CYLINDERS MONITORING BY WIRELESS TAGS

CROSS-REFERENCE TO RELATED APPLICATIONS

This application claims the benefit under 35 U.S.C. § 119 (e) to provisional application No. 60/826,792, filed Sep. 25, 2006, the entire contents of which are incorporated herein by reference.

BACKGROUND

Industrial gases are used in a wide variety of industries. Typically, industrial gases are distributed and stored in pressurized cylinders. Such cylinders are usually owned by a gas supplier, and are in the physical possession of clients while they are being used. Once the gas contained in a gas cylinder is consumed, the gas cylinders are returned to the gas supplier for reconditioning and refilling.

However, in the case of a gas supplier that owns a large number of gas cylinders, managing and tracking the inventory of gas cylinders can be a complicated and difficult task. One problem is determining when to replace a depleted gas cylinder (i.e., a gas cylinder that is empty or nearly empty), so that the customer does not run out of a gas supply. Another problem occurs when a specific cylinder must be located. If the gas cylinder is located in a large facility that includes many gas cylinders, finding a particular gas cylinder that must be returned to the supplier, or must be sent to a customer, can be difficult.

Yet another problem is tracking of the certification and maintenance of gas cylinders. In some cases, such certification and maintenance may be required by law or by company rules. This is especially important in the case of gas cylinders storing explosive or dangerous (e.g., toxic) gases. Otherwise, there may be a danger of explosions or toxic leaks due to defective equipment, for example a leaking cylinder.

Therefore, there is a need for techniques for the monitoring of gas cylinders.

SUMMARY

One embodiment of the invention provides a method for monitoring gas cylinders, comprising: receiving, at one or more wireless receivers, a wireless signal transmitted by a wireless transponder fixed to a gas cylinder, wherein the wireless signal includes an identifier identifying the gas cylinder; determining, based on one or more locations of the one or more wireless receivers, a location of the gas cylinder; determining whether the location of the gas cylinder matches an intended location, wherein the intended/proper location is retrieved from a database by using the identifier included in the wireless signal; if so, generating an alert communicating that the gas cylinder is not in the intended location. The method also comprises storing the location of the gas cylinder in the database.

Another embodiment of the invention provides a method for monitoring gas cylinders, comprising: receiving, at one or more wireless receivers, a plurality of wireless signals transmitted by a plurality of wireless transponders, wherein each transponder is fixed to one of a plurality of gas cylinders, and wherein each wireless signal includes an identifier identifying the respective gas cylinder; determining, based on the receipt of the plurality of wireless signals by the one or more wireless receivers, the available supplies of at least one type of gas at one or more locations; determining whether the available supplies of at least one type of gas are less than one or more required minimum levels specified for the one or more locations and for the respective type of gas; if so, generating an alert communicating a requirement for additional supplies of the respective gas at the respective location. The method also comprises storing the available supplies of at least one type of gas in the database.

Yet another embodiment of the invention provides a computer-readable storage medium storing instructions which when executed by a processor, performs a method, comprising: receiving, at one or more wireless receivers, a wireless signal transmitted by a wireless transponder fixed to a gas cylinder, wherein the wireless signal includes an identifier identifying the gas cylinder; determining, based on one or more locations of the one or more wireless receivers, a location of the gas cylinder; determining whether the location of the gas cylinder matches an intended location, wherein the intended/proper location is retrieved from a database by using the identifier included in the wireless signal; if so, generating an alert communicating that the gas cylinder is not in the intended location. The method also comprises storing the location of the gas cylinder in the database.

Yet another embodiment of the invention provides a system for the management of gas cylinders, comprising: a database; at least one wireless receiver disposed at a fixed position of a storage facility; a plurality of gas cylinders stored in at least one location; a plurality of wireless transponders, each fixed to a different gas cylinder of the plurality of gas cylinders, and each configured to transmit at least one wireless signal including an identifier identifying the respective gas cylinder; and a gas cylinder management application, configured to receive the data included in the wireless transmissions, and to selectively generate alerts communicating the presence of gas cylinders in improper locations based on the received data.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Embodiments of the present invention generally provide methods and systems for managing gas cylinders by using radio-frequency identification (RFID) technology. In one embodiment, each gas cylinder includes a RFID transponder configured to transmit a RFID signal. The RFID signal includes an identifier which uniquely identifies each gas cylinder, thus indicating the presence of the gas cylinder at a particular location. In addition, the RFID signal may include other useful information, such as gas pressure, temperature, etc. The RFID signals may be received by RFID receivers, which may be configured to transmit the received data to a server. In one embodiment, the server is remotely located and the received data may be transmitted to the remote server via a computer network. In one embodiment, the gas cylinder data received by the server is collected in a database, and thereafter used by a gas cylinder management software application. The gas cylinder management application may be configured to perform tasks such as selectively generating alarms, locating specific gas cylinders, and replenishment of gas supplies.

It is contemplated that any of the foregoing embodiments (and other embodiments disclosed herein) may be done separately or collectively (in any combination) in a given system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a networked computer system such as, for example, the networked system 200 shown in FIG. 2 and described below. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Distribution Network for Gas Cylinders Using RFID

Figure 1A:
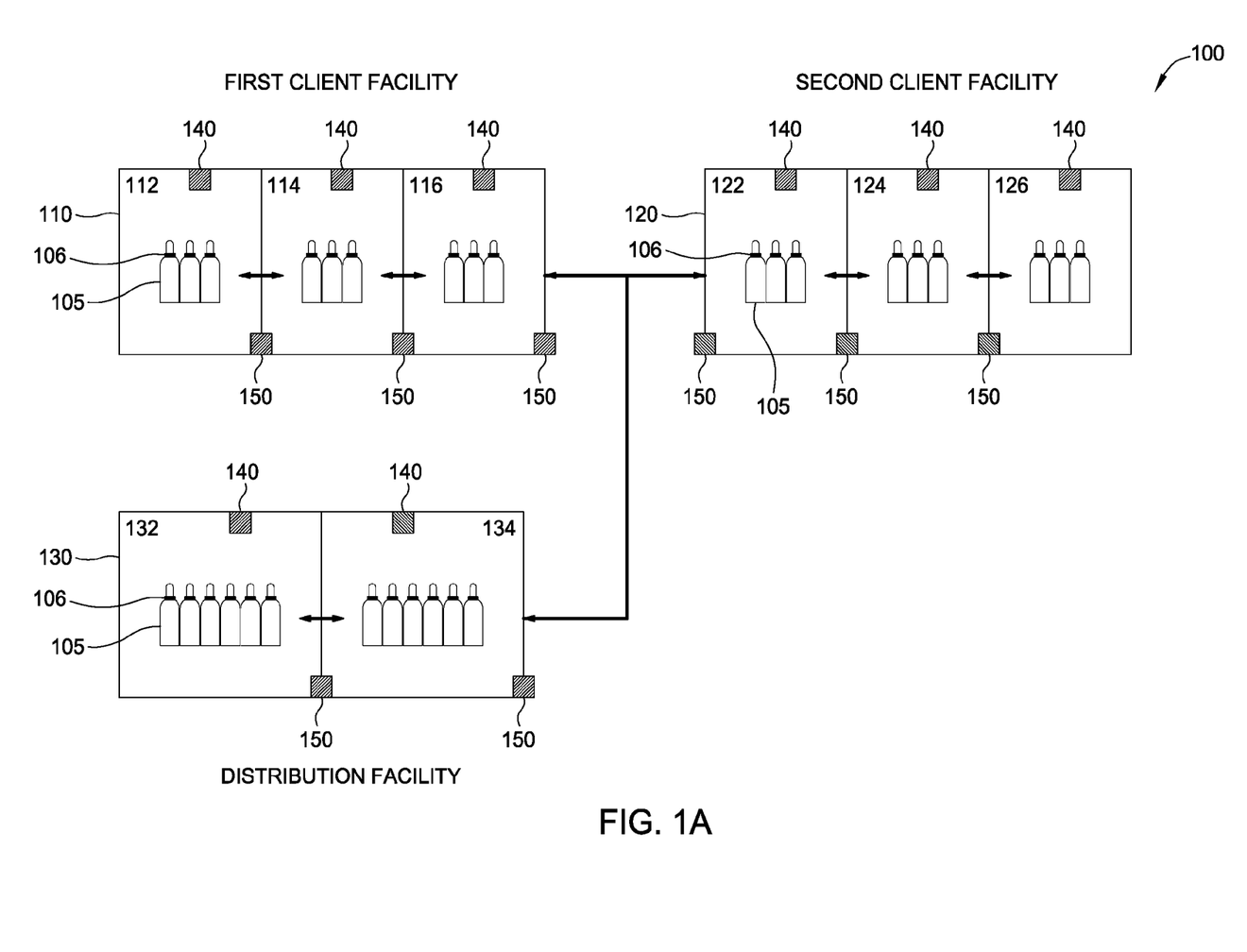
FIGS. 1A-1D illustrate a distribution network for gas cylinders equipped with radio-frequency identification (RFID) transponders, according to one embodiment of the invention.

FIG. 1A illustrates a distribution network 100 for gas cylinders using RFID according to one embodiment. In one embodiment, all gas cylinders 105 that are included in the distribution network 100 are equipped with RFID transponders 106. As shown, the distribution network 100 includes a first client facility 110, a second client facility 120, and a distribution facility 130 (e.g., a gas supplier). The first client facility 110 includes three areas 112, 114, 116 which include gas cylinders 105. The second client facility 120 includes three areas 122, 124, 126 which include gas cylinders 105. The distribution facility 130 includes two areas 132, 134 which include gas cylinders 105. As illustrated by arrows, gas cylinders 105 may be moved from one area to another within the same facility (e.g., from area 122 to area 124), or may be moved between facilities (e.g., from first client facility 110 to distribution facility 130).

As shown, each facility 110, 120, 130 also includes a set of localization RFID receivers 140 and a set of gateway RFID receivers 150. The localization RFID receivers 140 may be configured to receive RFID signals from the respective RFID transponders 106 of any gas cylinders 105 which are present in a given area (e.g., area 122). The gateway RFID receivers 150 may be configured to receive RFID signals from RFID transponders 106 for gas cylinders 105 passing through a gateway (e.g., a portal, a doorway, etc.). Further, the gateway RFID receivers 150 may be positioned around the gateway so as to improve the reception of RFID signals (e.g., positioned at the same height as a gas cylinder loaded on a forklift). In the example illustrated in FIG. 1, the gateway RFID receivers 150 are located at facility entry points (e.g., a loading dock for the distribution facility 130), and at gateways between areas in a given facility (e.g., between area 122 and area 124). Thus, the gateway RFID receivers 150 serve to detect the movement of gas cylinders 105 into or out of a particular area.

Figure 1B:
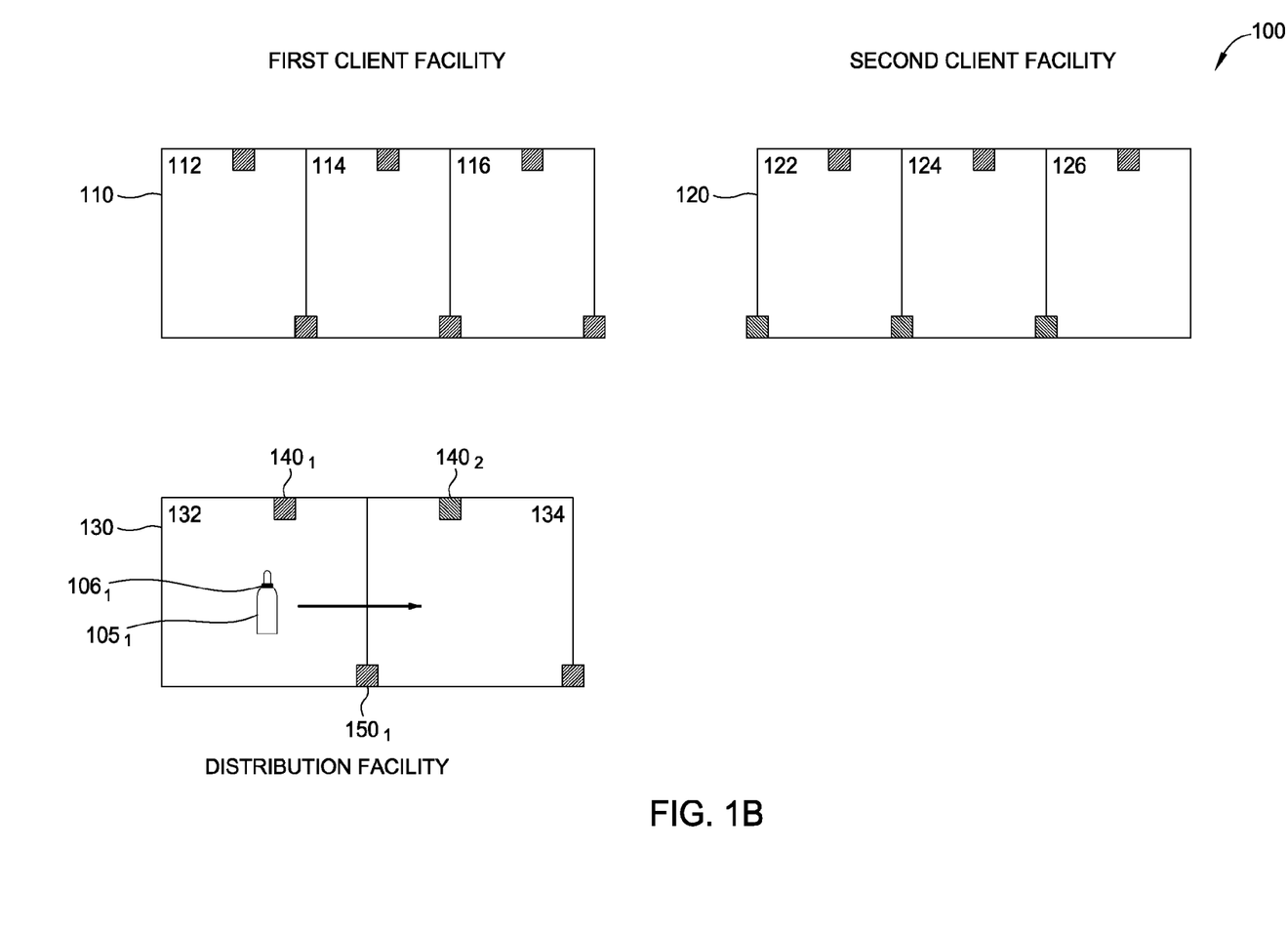
Figure 1C:
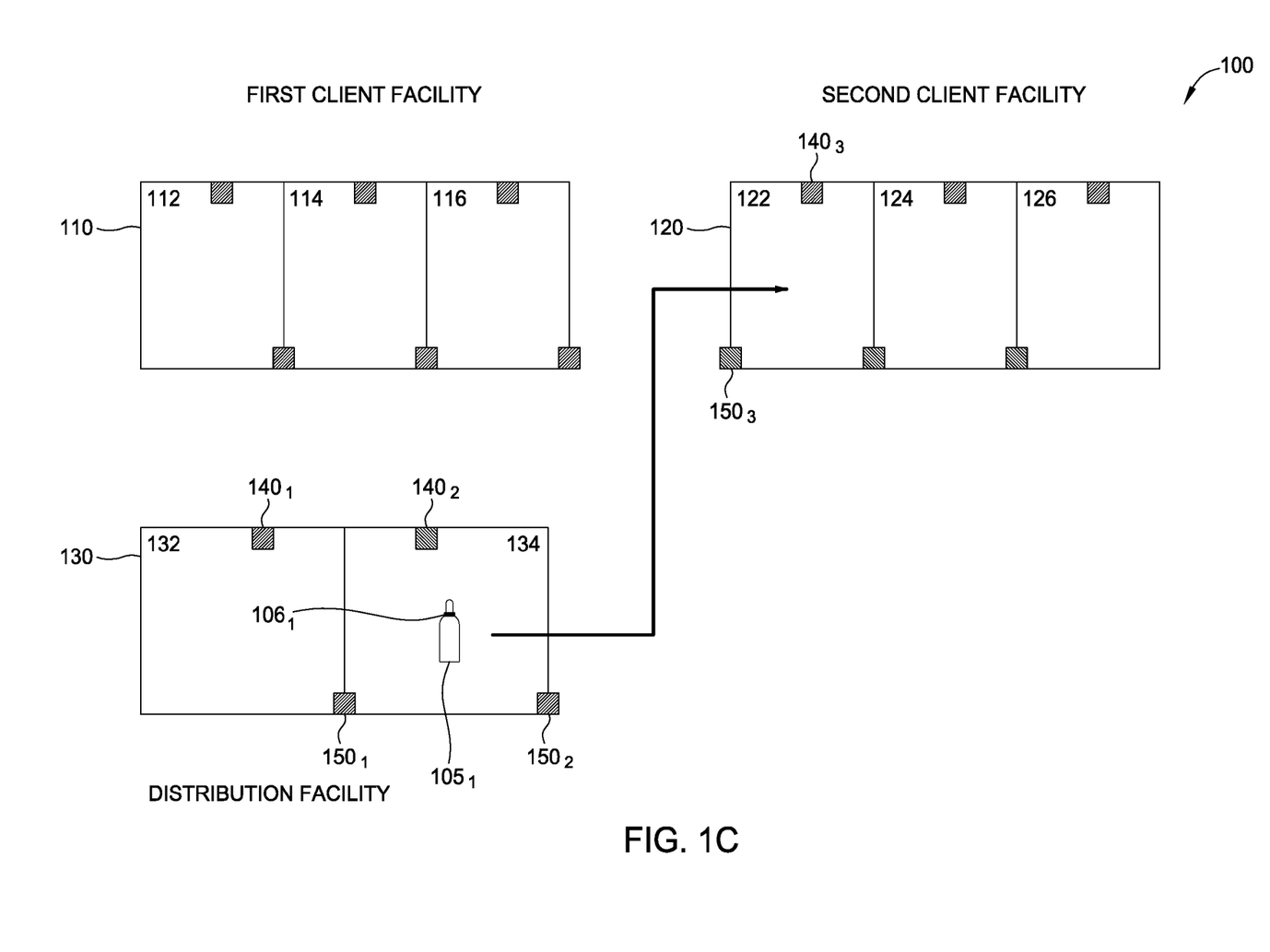
Figure 1D:
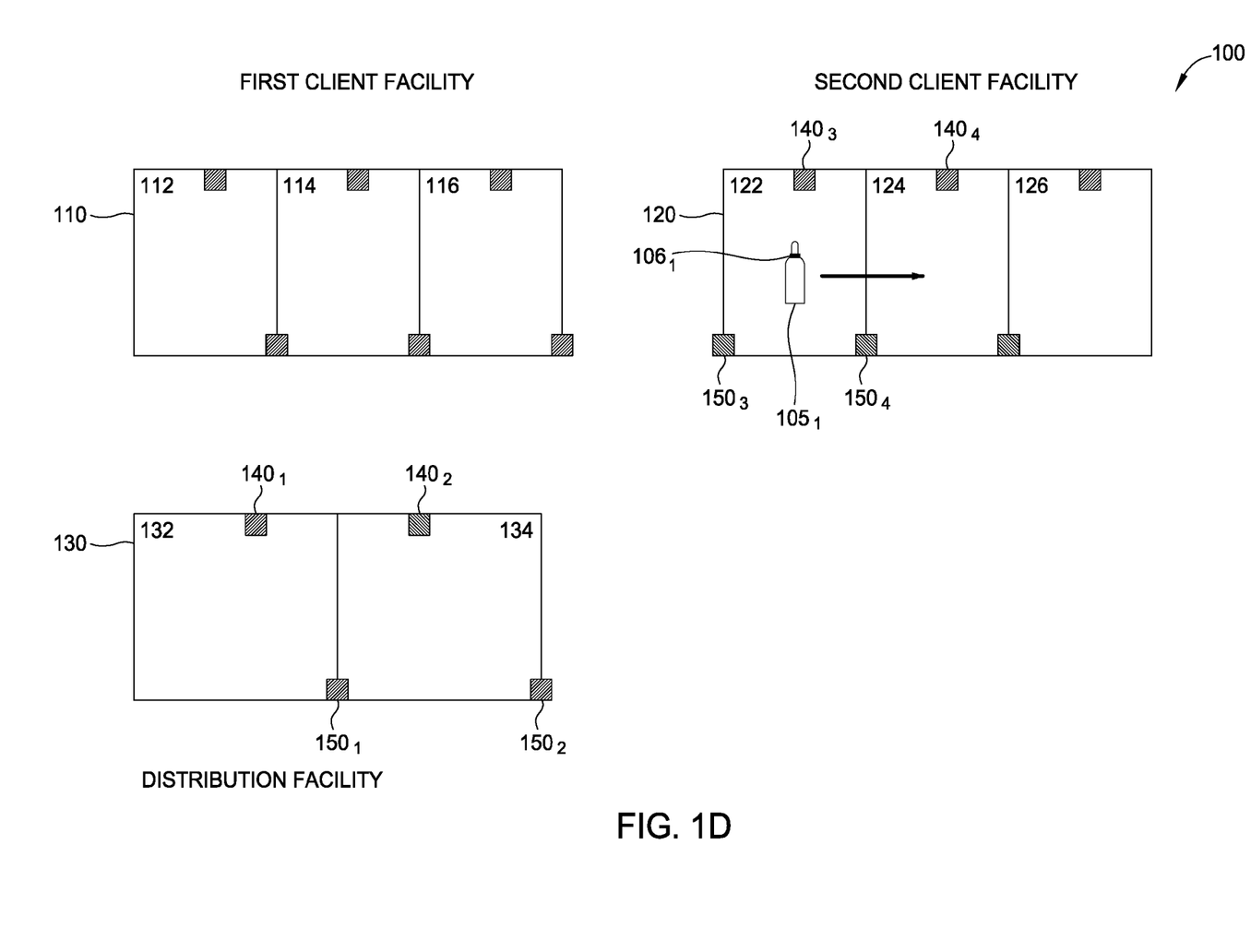

FIGS. 1B-1D illustrate an exemplary use of RFID receivers to track the location and movement of a single gas cylinder $105_1$, according to one embodiment. As shown in FIG. 1B, gas cylinder $105_1$ is initially located in area 132 of the distribution facility 130. This initial location may be detected by the localization RFID receiver $140_1$, which receives a RFID signal from the RFID transponder $106_1$ fixed to the gas cylinder $105_1$. As shown, the gas cylinder $105_1$ is moved to area 134. This movement may be detected by a gateway receiver $150_1$, which is positioned in proximity to the gateway between areas 132 and 134. Once this movement is completed, the location of the gas cylinder $105_1$ in area 134 may be detected by the localization RFID receiver $140_2$.

FIG. 1C illustrates the situation where the gas cylinder $105_1$ is further moved from the distribution facility 130 to the second client facility 120 (e.g., via truck delivery). The movement out of the distribution facility 130 may be detected by the gateway receiver $150_2$, and the movement into the second client facility 120 is detected by the gateway receiver $150_3$. Once this movement is completed, the location of the gas cylinder $105_1$ in area 122 may be detected by the localization RFID receiver $140_3$. FIG. 1D illustrates the situation where the gas cylinder $105_1$ is further moved from area 122 to area 124. This movement may be detected by the gateway receiver $150_4$. Once this movement is completed, the location of the gas cylinder $105_1$ in area 124 may be detected by the localization RFID receiver $140_4$.

Note that the distribution network 100 is provided for illustrative purposes, and is not intended to be limiting of the invention. It is contemplated that other embodiments may be used to advantage. For example, the distribution network 100 may include multiple distribution facilities 130 supplying a single client facility 110, or supplying other distribution facilities 130.

System Overview

Figure 2:
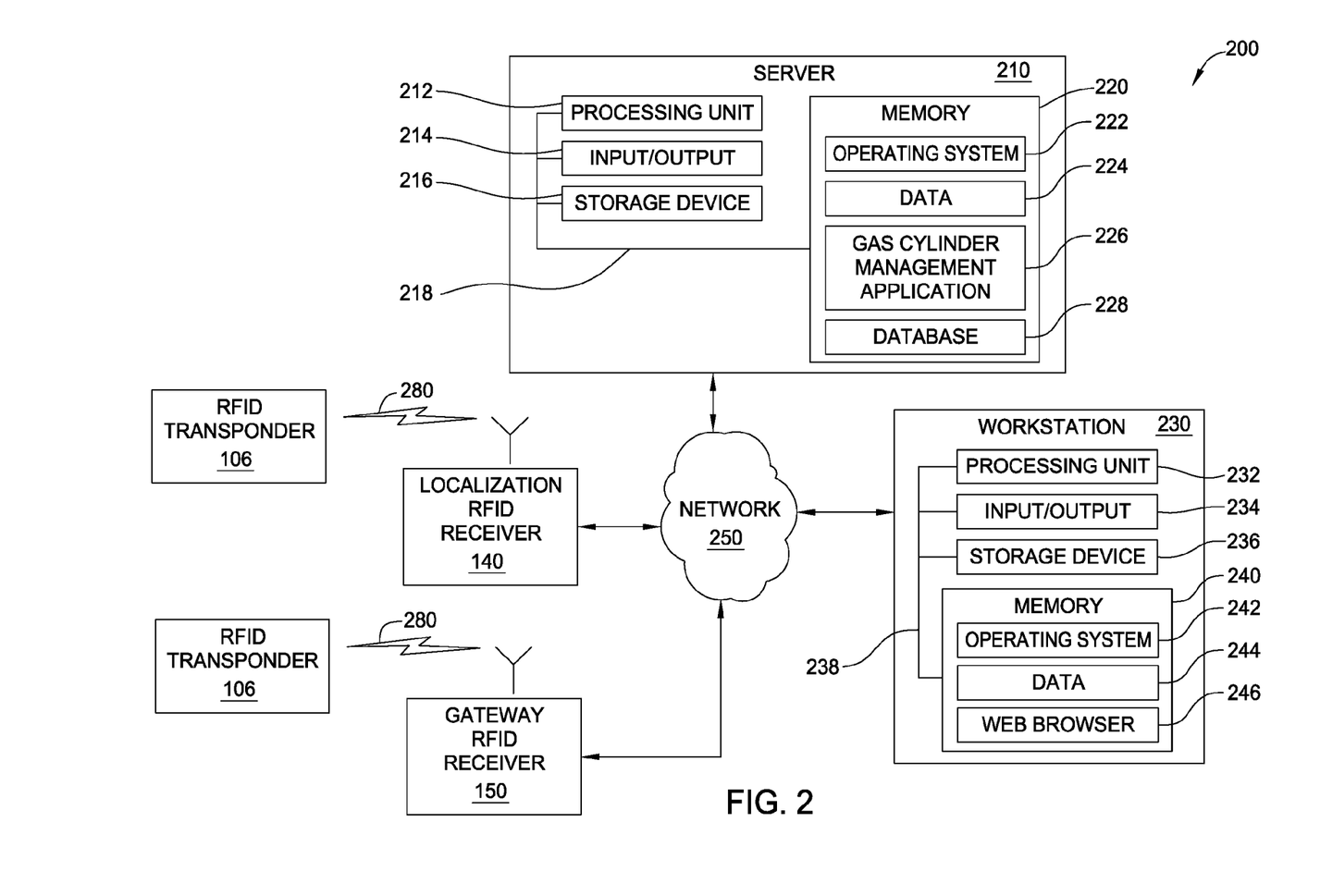
FIG. 2 illustrates a block diagram of a networked system, according to one embodiment of the invention.

Referring now to FIG. 2, a system 200 is shown according to one embodiment of the present invention. In one embodiment of the invention, the system 200 may include a localization RFID receiver 140 and a gateway RFID receiver 150, each configured to receive RFID signals 280 from RFID transponders 106. Generally, RFID signals 280 may be used to determine whether a "tagged" gas cylinder (i.e., a cylinder fixed to a RFID transponder 106) is located in, or passing through, a given area. As is well-known in the art, the use of RFID signals may be limited to a fixed range, which is typically dependent on the effective range of the RFID transponder and of the RFID receiver.

In one embodiment, a localization RFID receiver may be configured and positioned such that the source of a received RFID signal can be located within some area. For example, a localization receiver 140 may be positioned in the center of a storage room, and any received RFID signals 280 may be determined to be within the boundaries of the storage room. Thus, a particular gas cylinder can be determined to be present in a given area. In another embodiment, localization RFID receivers 140 may be used in groups, thus allowing the triangulation of a RFID signal 280 (if received by multiple RFID receivers sufficient in number to perform triangulation; e.g., three or more RFID receivers). Such triangulation may be used to determine a more specific location for a particular gas cylinder, such as a sub-location within a storage room, or location coordinates within a facility. It is contemplated that the triangulation of the RFID signal 280 may be performed using any suitable technique, for example, measurement of signal strength, comparison of signal propagation times, use of directional antennas, and the like.

In one embodiment, a gateway receiver may be configured and positioned such that the source of a received RFID signal may be determined to be passing within a particular gateway. For example, a gateway receiver 150 may be positioned at an entry portal to a storage room, and items corresponding to any received RFID signals 280 may thereafter be assumed to be located within the storage room.

In one embodiment, each RFID transponder 106 is fixed to a gas cylinder, and may be configured to remain inactive until it receives a wireless excitation (i.e., activation) signal. Once activated, each RFID transponder 106 responds by transmitting a RFID signal 280 including an identification code that may be used to uniquely identify each gas cylinder. The RFID transponders 106 may be active transponders, meaning that the RFID signal 280 is transmitted with an active power source (e.g., a battery). In another embodiment, the RFID transponders 106 may be passive transponders, meaning that the RFID transponders 106 are powered inductively by an inductive power coupling with a proximately located RFID receiver configured to issue an activation signal. In yet another embodiment, the RFID transponders 106 may include a combination of active and passive transponders, where both transponders may transmit the same cylinder identification code. For example, a given RFID transponder 106 may include an active transponder configured to transmit to a localization receiver 140, as well as a passive transponder configured to transmit to a gateway receiver 150. In yet another embodiment, each RFID transponder 106 may include an active transponder configured to periodically (or constantly) transmit the RFID signal 280, without requiring an activation signal. In yet another embodiment, an RFID transponder 106 may be configured to store data included in inbound RFID signals (e.g., an activation signal). Such stored data may include a transaction code, a time stamp, etc. In yet another embodiment, an RFID transponder 106 may be configured to receive commands included in inbound RFID signals and, in response, to perform an action within the transponder, such as activating, deactivating, or resetting the transponder. Additionally, the RFID transponder 106 may configured to control an external actuator fixed to the gas cylinder. For example, a gas cylinder may be configured with a control valve, which may be opened or closed in response to commands received by a RFID transponder 106.

The RFID signals 280 may conform to RFID protocols known in the art, or to any other wireless communication protocols including, for example IEEE 802.11, Global System for Mobile Communications (GSM), Bluetooth, or ZigBee.

In one embodiment, the localization RFID receiver 140 and a gateway RFID receiver 150 may be configured to transmit the data from the received RFID signals 280 to a central server 210 via a network 250. The network 250 may include any wired or wireless networks known in the art, for example Ethernet, IEEE 802.11, Token Ring, and the like. It is contemplated that the central server 210 may be remotely located (e.g., at distribution facility 130), and may be used by a gas supplier to monitor and manage gas cylinders owned by the gas supplier.

The processing in the central server 210 may be performed by a processing unit 212. The processing unit 212 may process programs in a memory 220, including an operating system 222 for the central server 210. In addition, the programs may include a gas cylinder management application 226 and a database 228. The database 228 may be any type of database known in the art, for example a relational database. The gas cylinder management application 226 may be configured to analyze data sent by multiple RFID receivers (e.g., receivers 140, 150).

Generally, the gas cylinder management application 226 may be configured for the management of gas cylinders, for example the gas cylinders 105 of distribution network 100 shown in FIG. 1. For instance, users of the gas cylinder management application 226 may perform asset management, such as locating a specific gas cylinder, performing an inventory, etc. Further, users may manage the replenishment of gas stocks as they are needed, including just-in-time replenishment at a remote client facility (e.g., client facilities 110, 120). Furthermore, the gas cylinder management application 226 can be configured to analyze data received from the wireless transponders 106 to selectively generate alarms. For example, an alarm may be generated when a gas cylinder is present in (or enters) a restricted area, or when two incompatible gases (e.g., gases that are reactive to each other) are stored together improperly. Other alarms may be generated, for example, when conditions (e.g., pressure, temperature, etc.) are outside acceptable ranges, when an improper gas flow is detected, when the stored gas is past its expiration date, when a cylinder is due for (or is past) a required certification (e.g., pressure testing), or when the battery powering the wireless transponder is low.

In one embodiment, the gas cylinder management application 226 may be presented in a web-based user interface (i.e., Internet web pages). The processing unit 212 may also process data 224 and other programs or information. Such data and programs may also be stored in a storage device 216 such as a hard drive or other computer-readable medium (e.g., a compact disc, random access memory, or read-only memory). The central server 210 may utilize an input/output interface 214 to request and/or receive data from the network 250. Internal components of the central server 210 may communicate via a data bus 218.

A workstation 230 may be used to access the central server 210 over the network 250 and to access the gas cylinder management application 226. In one embodiment, processing in the workstation computer 230 may be performed by a processing unit 232. The processing unit 232 may process programs in a memory 240 including an operating system 242 for the workstation computer 230. In addition, the processing unit 232 may also process data 244 and other programs such as a web browser 246. The web browser 246 may be used to access web applications on the central server 210, such as the gas cylinder management application 226. Thus, the web browser 246 may be used to remotely monitor and manage a gas cylinder system. Such data and programs may also be stored in a storage device 236 such as a hard drive or other computer-readable medium (e.g., a compact disc or read-only memory). The workstation computer 230 may utilize an input/output interface 234 to request and/or receive data from the network 250. Internal components of the workstation computer 230 may communicate via a data bus 238.

Gas Cylinder Equipped with Wireless Transponder

Figure 3:
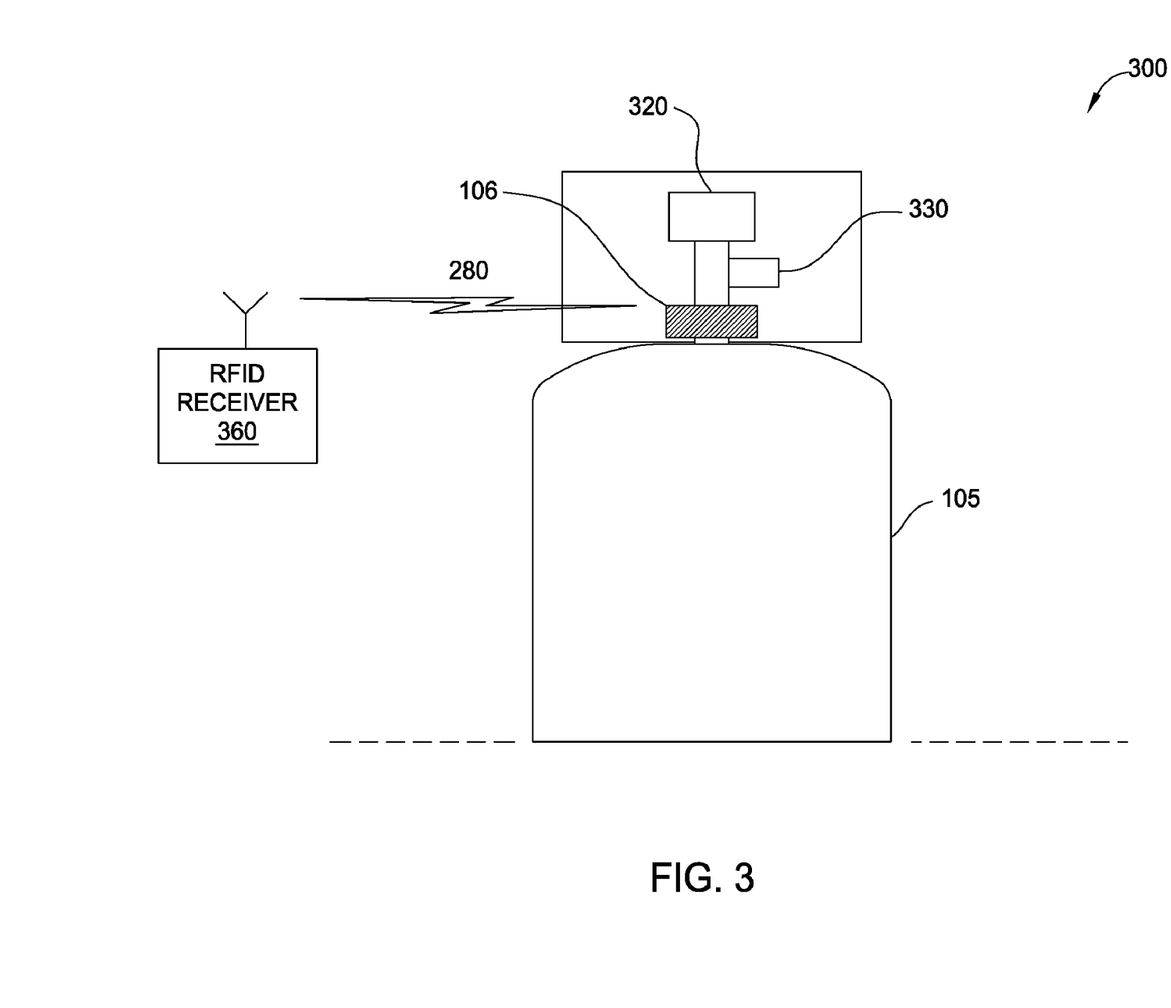
FIG. 3 illustrates a block diagram of a gas cylinder equipped with a wireless transmitter, according to one embodiment of the invention.

FIG. 3 illustrates a block diagram 300 of a gas cylinder 105 equipped with a wireless transponder 106, according to one embodiment of the invention. As shown, the gas cylinder 105 may also include a valve assembly 320 and a connector 330. In one embodiment, the valve assembly 320 may include one or more sensors (not shown) configured to measure and/or detect properties of the gas cylinder 105. Such properties may include, for example, pressure, and temperature of the contents of the gas cylinder, or the flow rate of gas through the valve assembly 320. In one embodiment, the wireless transponder 106 may be configured to include the measurements generated by the sensors of the valve assembly 320 in RFID signal 280. That is, in addition to the identification data corresponding to the gas cylinder, a RFID signal 280 may include state data describing the gas cylinder or its contents. Accordingly, the wireless transponder 106 may include, or be communicatively connected to, an encoder to encode the RFID signal 280 with the various state data. A RFID receiver 360 (e.g., a localization RFID receiver 140 or a gateway RFID receiver 150) may be configured to receive such RFID signals 280, to extract the included identification and measurement data, and to communicate the extracted data to a central server (e.g., central server 220). In one embodiment, the valve assembly 320 may include one or more actuators (not shown) controlled by commands included in inbound RFID signals. Accordingly, the wireless transponder 106 may be configured to receive inbound RFID signals, and may include, or be communicatively connected to, a controller configured to control actuators fixed to the cylinders.

Of course, the example illustrated in FIG. 3 is provided for illustrative purposes only. It is contemplated that other embodiments may be used to advantage. For example, the sensors may be included in the gas cylinder 105, or may be included in the wireless transponder 106, or may be used as separate components. In situations where the gas cylinder 105 stores an explosive gas (e.g., oxygen), the wireless transponder 106 may be configured within a sealed enclosure (not shown), thus minimizing the likelihood of explosion due to electrical sparks. Any of these embodiments, as well as any other beneficial arrangement of the components of the invention, are included in the scope of the invention.

Method Flow Diagrams

Figure 4:
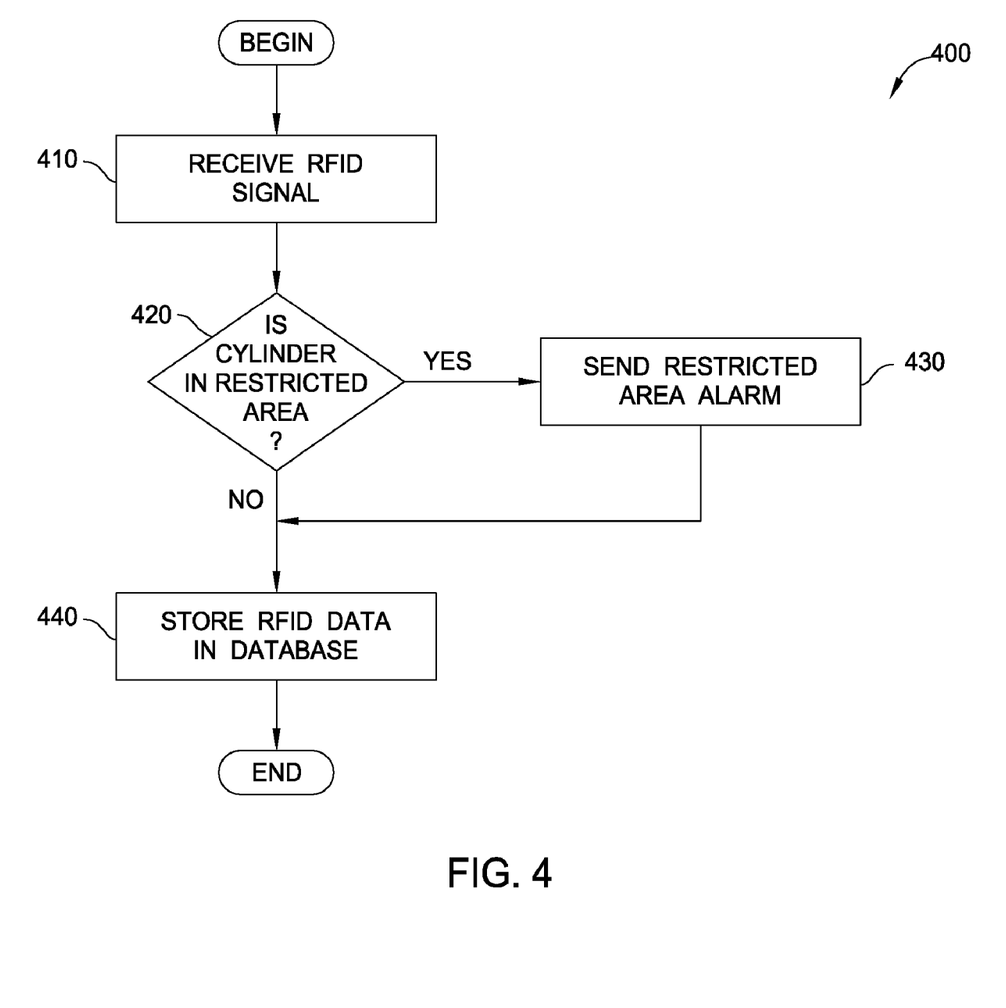
FIG. 4 is a flow diagram depicting a method for processing RFID signals received from gas cylinders, according to one embodiment of the invention.

FIG. 4 is a flow diagram depicting a method 400 for processing RFID signals received from gas cylinders, according to one embodiment of the invention. The method 400 begins at step 410, where a RFID signal is received (e.g., RFID signal 280 shown in FIGS. 2-3). The RFID signal may conform to any suitable wireless protocol. The RFID signal may be received by a RFID receiver, such as the localization RFID receiver 140 or the gateway RFID receiver 150 illustrated in FIG. 1. As described, a localization receiver can be used to determine the presence of a RFID-equipped object within a space, and a gateway receiver can be used to determine whether a RFID-equipped object has crossed a gateway.

At step 420, it is determined whether a gas cylinder is in a restricted area. That is, whether a gas cylinder storing a particular type of gas is present in (or entering into) an area in which that type of gas is not permitted. Such restrictions may be based on safety concerns. For example, cylinders storing explosive gases may not be allowed to be present in storage rooms which are excessively hot, or which may have electrical devices that cause sparks. If the gas cylinder is entering a restricted area, the method 400 continues at step 430, by sending an alarm communicating the presence of a gas cylinder in a restricted area. Otherwise, the method 400 continues at step 440, where the data received in the RFID signal is stored in a database (e.g., database 228 shown in FIG. 2). Thereafter, the stored data may be accessed by an application configured for managing gas cylinders (e.g., gas cylinder management application 226).

Figure 5:
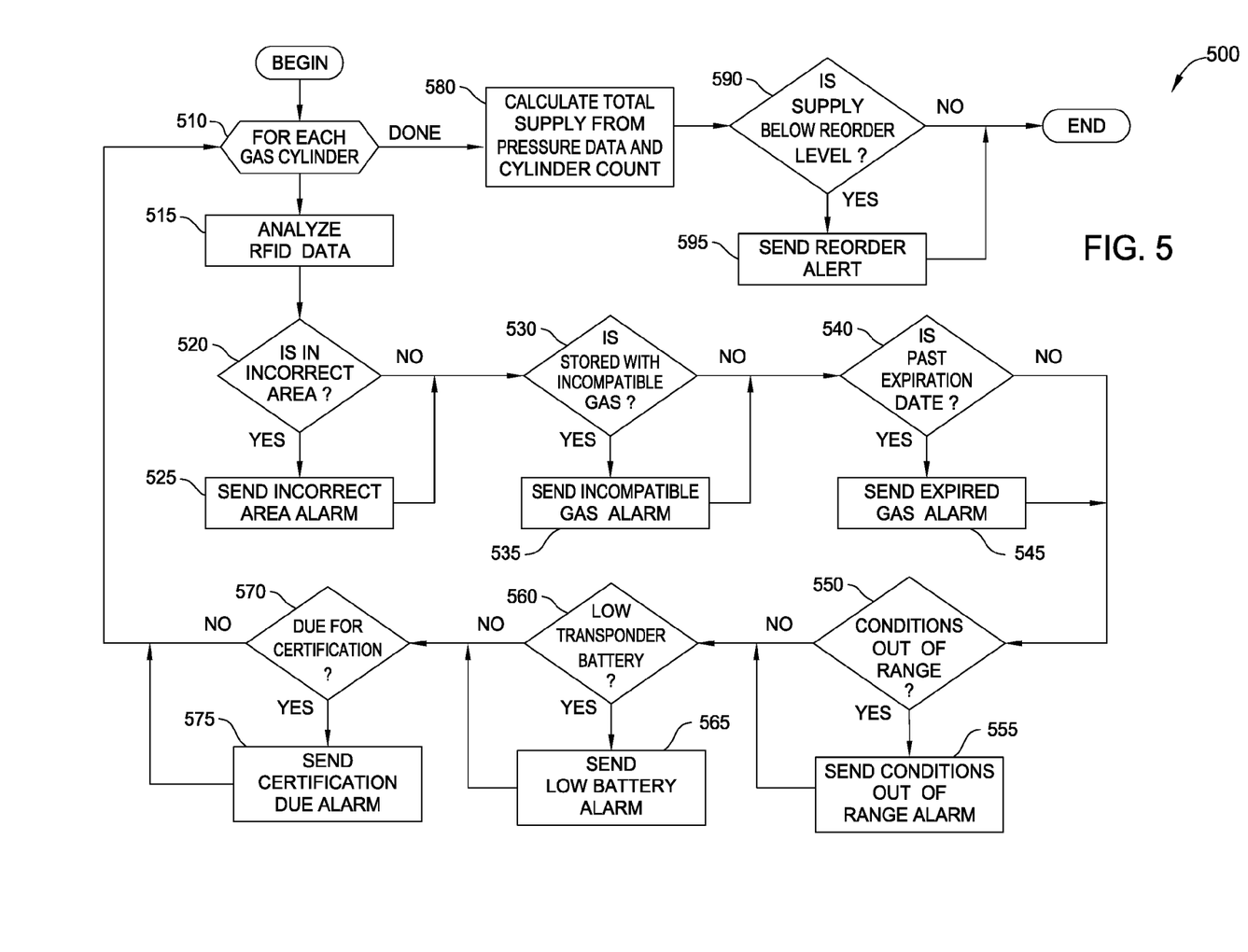
FIG. 5 is a flow diagram depicting a method for the management of gas cylinders, according to one embodiment of the invention.

FIG. 5 is a flow diagram depicting a method 500 for the management of gas cylinders, according to one embodiment of the invention. It is anticipated that the method 500 may be applied to an industrial distribution system of gas cylinders, such as that illustrated in FIG. 1. Specifically, the method 500 assumes facilities storing gas cylinders (e.g., facilities 110, 120, 130) that are equipped with RFID transponders (e.g., localization RFID receivers 140 and gateway RFID receivers 150).

The method 500 begins at step 510, where the method 500 enters a loop (defined by steps 515, 520, 525, 530, 535, 540, 545, 550, 555, 560, 565, 570, and 575) for processing data received from multiple wireless transponders fixed to gas cylinders (e.g., RFID transponder 106 fixed to cylinder 105, as illustrated in FIG. 3). The data may be included in a wireless transmission (e.g., RFID signal 280) which is received by one or more wireless receivers (e.g., RFID receiver 360). At step 515, the received data is analyzed and summarized for each gas cylinder. For instance, the received data may include an identifier which identifies each gas cylinder. In addition, the current location of the gas cylinder may be determined by analyzing the location of the wireless receiver(s) which received the wireless transmission, the range of the wireless transmission, and the triangulation of the wireless transmission (if received by multiple wireless receivers).

At step 520, it is determined whether the gas cylinder is stored or present in an incorrect area. One approach for performing step 520 may be to evaluate whether the gas cylinder is in an intended location. The intended location for the gas cylinder may have been previously specified, and may be retrieved, for example, from a query of a database storing gas cylinder data (e.g., database 228 illustrated in FIG. 2). Such a query may be performed using the gas cylinder identifier included in the wireless transmission. Another approach for performing this step may be to evaluate whether the gas stored in the gas cylinder is restricted from being stored in the area in which it is located. The gas stored in the gas cylinder may be retrieved, for example, from a query of a database storing gas cylinder data. If the gas cylinder is in an incorrect area, the method 500 continues to step 525, where an alarm communicating that the gas cylinder is an incorrect area is sent to an appropriate destination. For example, the alarm may be presented to a user of the gas cylinder management application 226, may be sent via email, may be sent as a pager message, or in any other suitable method.

The method 500 continues at step 530, where it is determined whether the gas cylinder is stored improperly with other gas cylinders that contain incompatible gases. That is, some types of gases may be restricted from being stored in the same location if, for example, the gases may strongly react with other. If so, the method 500 continues to step 535, at which an alarm is raised communicating that the gas cylinder is stored with another gas cylinder containing an incompatible gas. The method 500 continues at step 540, where it is determined whether the gas cylinder is past an expiration date, or is within some period of expiring (e.g., will expire in the next week). This step is applied in the situation where a gas cylinder is assigned an expiration date, such as some gas cylinders storing medical gases. The expiration date may be retrieved, for example, from a query of a database storing gas cylinder data. If so, the method 500 continues at step 545, where an alarm is raised communicating that the gas cylinder has expired.

The method 500 continues at step 550, where it is determined whether specific conditions of the gas cylinder and its contents are outside acceptable operating ranges. In one embodiment, the gas cylinder may include sensor configured to measure properties such as gas pressure, temperature, gas flow, and the like. In addition, the wireless transponder may be configured to measure a power level for a battery that powers it. These measurements may be included in the data received from the wireless transponders fixed to the gas cylinders. The acceptable ranges may have been previously specified, and may be retrieved, for example, from a query of a database storing gas cylinder data. Additionally, a positive gas flow measurement of the gas cylinder may indicate, for example, a gas leak from a gas cylinder. If the conditions of the gas cylinder are outside acceptable ranges, the method 500 continues at step 555, where an alarm is raised communicating that the gas cylinder has conditions that are out of acceptable ranges. The method 500 continues at step 560, where it is determined whether a battery of the wireless transponder needs to be replaced or recharged. This determination may be based on a measurement of battery power included in the wireless transmission. If so, the method 500 continues at step 565, where an alarm is raised communicating the need to replace or recharge the battery of the wireless transponder fixed to the gas cylinder.

The method 500 continues at step 570, where it is determined whether the gas cylinder is due for a safety inspection and/or certification. This step is applied in the situation where a gas cylinder is required to be periodically inspected and/or certified, such as a pressure proofing test. Such a due date may be retrieved, for example, from a query of a database storing gas cylinder data. If so, the method 500 continues at step 575, where an alarm is raised communicating that the gas cylinder is due for a safety inspection and/or certification.

Once the processing of the data from all the wireless sensors of the medical gas system has been completed at step 510, the method 500 continues at step 580, where a total supply of a gas that is available at a given location is calculated. This calculation may be based on the total cylinder count indicated by the received wireless transmissions. In addition, if pressure measurements from each gas cylinder are measured at step 550, such measurements may also be used in calculating a total supply. At step 590, the total supply of a gas calculated at step 580 is compared to a reorder level. That is, to determine whether additional supplies of a gas are needed at a particular location. This step may be performed, for example, by a gas supplier who actively manages the gas supplies of clients. The gas supplier may use a gas cylinder management application (e.g., gas cylinder management application 226). If the total supply of a gas is at (or below) a reorder level, the method 500 continues at step 595, where an alarm is raised communicating the need to replenish the gas supply. In addition, step 595 may include initiating a replenishment order using, for example electronic data interchange (EDI) or web technologies to transmit the order. After step 595, the method 500 ends. It should be noted that, while the specific embodiments have been described with reference to tracking gas cylinders, it is contemplated that embodiments of the invention could be applied to tracking any variety of objects other than gas cylinders.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for monitoring gas cylinders, comprising:
receiving, at one or more wireless receivers, a wireless signal transmitted by a wireless transponder fixed to a gas cylinder, wherein the wireless signal includes an identifier identifying the gas cylinder;
determining, based on one or more locations of the one or more wireless receivers, a location of the gas cylinder;
determining whether the location of the gas cylinder matches an intended location, wherein the intended location is retrieved from a database by using the identifier included in the wireless signal; and
upon determining that the location of the gas cylinder matches does not match the intended location retrieved from the database, generating an alert communicating that the gas cylinder is not in the intended location.

2. The method of claim 1, further comprising:
determining a type of gas stored in the gas cylinder based on data retrieved from the database by using the identifier included in the wireless signal;
determining whether the gas stored in the gas cylinder is restricted from being stored within an area in which the gas cylinder is located; and upon determining that the gas stored in the gas cylinder is restricted from being stored within an area, generating an alert communicating the presence of the restricted gas within the area.

3. The method of claim 2, further comprising:
identifying one or more additional gas cylinders located in the area;
determining one or more types of gases stored in the one or more additional gas cylinders;
determining whether the one or more types of gases stored in the one or more additional gas cylinders are restricted from being stored in the same area as the gas stored in the gas cylinder; and
upon determining that the one or more types of gases stored in the one or more additional gas cylinders are restricted from being stored in the same area as the gas stored in the gas cylinder, generating an alert communicating the restricted storage of gases within the same area.

4. The method of claim 1, wherein the wireless signal further includes one or more measurements of one or more properties of at least one of the gas cylinder and contents of the gas cylinder, and further comprising:
determining whether any of the one or more measurements of the one or more properties are outside one or more predetermined ranges of acceptable measurements; and
upon determining that any of the one or more measurements of the one or more properties are outside one or more predetermined ranges of acceptable measurements, generating an alert communicating the existence of an abnormal measurement of a property of the one or more properties.

5. The method of claim 4, wherein the one or more properties are selected from gas pressure, temperature, and flow rate.

6. The method of claim 1, wherein the wireless signal further includes an indication of available power in a battery powering the wireless transponder, and further comprising:
upon determining that the available power of the battery is below a predetermined threshold, generating an alert communicating a need to replace the battery of the wireless transponder.

7. The method of claim 1, wherein the wireless signal further includes an expiration date for contents of the gas cylinder, and further comprising:
upon determining that the expiration date is at least one of (i) passed, and (ii) within a predetermined period of being passed, generating an alert communicating the expiration date.

8. The method of claim 1, wherein the wireless signal further includes a safety inspection and certification date for the gas cylinder, and further comprising:
upon determining that the inspection and certification date is at least one of (i) passed, and (ii) within a predetermined period of being passed, generating an alert communicating the need to perform a safety inspection and certification on the gas cylinder.

9. The method of claim 1, further comprising:
in response to a query of the database for a location of the gas cylinder, returning the location of the gas cylinder.

10. A method for monitoring gas cylinders, comprising:
receiving, at one or more wireless receivers, a plurality of wireless signals transmitted by a plurality of wireless transponders, wherein each transponder is fixed to one of a plurality of gas cylinders, and wherein each wireless signal includes an identifier identifying the respective gas cylinder;
determining, based on the receipt of the plurality of wireless signals by the one or more wireless receivers, the available supplies of at least one type of gas at one or more locations;
determining whether the available supplies of at least one type of gas are less than one or more required minimum levels specified for the one or more locations and for the respective type of gas; and
upon determining that the available supplies of at least one type of gas are less than one or more required minimum levels specified for the one or more locations and for the respective type of gas, generating an alert communicating a requirement for additional supplies of the respective gas at the respective location.

11. The method of claim 10, wherein each wireless signal further includes a measurement of gas pressure in the respective gas cylinder, and wherein determining the available supplies of at least one type of gas at one or more locations is further based on the gas pressures of each gas cylinder.

12. A computer-readable storage medium storing a program which, when executed by a processor, performs a process for managing gas cylinders, the process comprising:
receiving, at one or more wireless receivers, a wireless signal transmitted by a wireless transponder fixed to a gas cylinder, wherein the wireless signal includes an identifier identifying the gas cylinder;
determining, based on one or more locations of the one or more wireless receivers, a location of the gas cylinder;
determining whether the location of the gas cylinder matches an intended location, wherein the intended/proper location is retrieved from a database by using the identifier included in the wireless signal; and
upon determining that the location of the gas cylinder matches does not match the intended location retrieved from the database, generating an alert communicating that the gas cylinder is not in the intended location.

13. The computer-readable storage medium of claim 12, wherein the process further comprises:
determining a type of gas stored in the gas cylinder based on data retrieved from the database by using the identifier included in the wireless signal;
determining whether the gas stored in the gas cylinder is restricted from being stored within an area in which the gas cylinder is located; and
upon determining that the gas stored in the gas cylinder is restricted from being stored within an area, generating an alert communicating the presence of the restricted gas within the area.

14. The computer-readable storage medium of claim 13, wherein the process further comprises:
identifying one or more additional gas cylinders located in the area;
determining one or more types of gases stored in the one or more additional gas cylinders;
determining whether the one or more types of gases stored in the one or more additional gas cylinders are restricted from being stored in the same area as the gas stored in the gas cylinder; and
upon determining that the one or more types of gases stored in the one or more additional gas cylinders are restricted from being stored in the same area as the gas stored in the gas cylinder, generating an alert communicating the restricted storage of gases within the same area.

15. The computer-readable storage medium of claim 12, wherein the wireless signal further includes one or more measurements of one or more properties of at least one of the gas cylinder and contents of the gas cylinder, and wherein the process further comprises:

determining whether any of the one or more measurements of the one or more properties are outside one or more predetermined ranges of acceptable measurements; and upon determining that any of the one or more measurements of the one or more properties are outside one or more predetermined ranges of acceptable measurements, generating an alert communicating the existence of an abnormal measurement of a property of the one or more properties.

16. The computer-readable storage medium of claim 15, wherein the one or more properties are selected from gas pressure, temperature, and flow rate.

17. The computer-readable storage medium of claim 12, wherein the wireless signal further includes an indication of available power in a battery powering the wireless transponder, and wherein the process further comprises:

upon determining that the available power of the battery is below a predetermined threshold, generating an alert communicating a need to replace the battery of the wireless transponder.

18. The computer-readable storage medium of claim 12, wherein the wireless signal further includes an expiration date for contents of the gas cylinder, and wherein the process further comprises:

upon determining that the expiration date is at least one of (i) passed, and (ii) within a predetermined period of being passed, generating an alert communicating the expiration date.

19. The computer-readable storage medium of claim 12, wherein the wireless signal further includes a safety inspection and certification date for the gas cylinder, and wherein the process further comprises:

upon determining that the inspection and certification date is at least one of (i) passed, and (ii) within a predetermined period of being passed, generating an alert communicating the need to perform a safety inspection and certification on the gas cylinder.

20. The computer-readable storage medium of claim 12, wherein the process further comprises:

in response to a query of the database for a location of the gas cylinder, returning the location of the gas cylinder.

21. A system for the management of gas cylinders, comprising:

a processor;
a database stored on a computer readable storage medium;
at least one wireless receiver disposed at a fixed position of a storage facility;
a plurality of gas cylinders stored in at least one location;
a plurality of wireless transponders, each fixed to a different gas cylinder of the plurality of gas cylinders, and each configured to transmit at least one wireless signal including an identifier identifying the respective gas cylinder; and
a gas cylinder management application which, when executed by the processor, is configured to receive the data included in the wireless transmissions, and to selectively generate alerts communicating the presence of gas cylinders in improper locations based on the received data.

22. The system of claim 21, wherein the gas cylinder management application is further configured to selectively generate alerts communicating the storage, in one location, of two or more types of gases that are restricted from being stored in the same location.

23. The system of claim 21, further comprising a plurality of sensors, each fixed to a gas cylinder of the plurality of gas cylinders, and each configured to measure one or more properties of at least one of the respective gas cylinder and contents of the respective gas cylinder, wherein each wireless transponder is configured to include measurement data in the wireless signals, and wherein the gas cylinder management application is further configured to selectively generate alerts communicating the existence of an abnormal measurement of a property of the one or more properties.

24. The system of claim 23, wherein the one or more properties measured by the plurality of sensors are selected from gas pressure, temperature, and flow rate.

25. The system of claim 21, wherein each wireless signal further includes an indication of available power in a battery powering the respective wireless transponder, and wherein the gas cylinder management application is further configured to selectively generate alerts communicating the need to replace the battery of the respective wireless transponder.

26. The system of claim 21, wherein each wireless signal further includes an expiration date for contents of the respective gas cylinder, and wherein the gas cylinder management application is further configured to selectively generate alerts communicating the expiration of the contents of the respective gas cylinder.

27. The system of claim 21, wherein each wireless signal further includes a safety inspection and certification date for the respective gas cylinder, and wherein the gas cylinder management application is further configured to selectively generate alerts communicating the need to perform a safety inspection and certification on the respective gas cylinder.

28. The system of claim 21, wherein the gas cylinder management application is further configured to calculate the available supplies of at least one type of gas stored in the plurality of gas cylinders at one or more locations, and to selectively generate alerts communicating that the available supplies of at least one type of gas are less than one or more required minimum levels specified for the at least one location and for the respective type of gas.

29. The system of claim 28, wherein each wireless signal further includes a measurement of gas pressure in the respective gas cylinder, and wherein the gas cylinder management application is further configured to calculate the available supplies of at least one type of gas based on the gas pressures of each gas cylinder.

30. The system of claim 21, wherein each wireless transponder is further configured to receive a wireless control signal, and in response, to perform a control action on the respective gas cylinder, wherein the control action is selected from closing a valve and opening a valve of the respective gas cylinder.

31. The method of claim 1, wherein the one or more wireless receivers include at least three wireless receivers that each receive the wireless signal, and wherein determining the location of the gas cylinder comprises triangulating the wireless signal based on locations of the at least three wireless receivers to determine location coordinates for the gas cylinder.

32. The computer-readable storage medium of claim 12, wherein the one or more wireless receivers include at least three wireless receivers that each receive the wireless signal, and wherein determining the location of the gas cylinder comprises triangulating the wireless signal based on locations of the at least three wireless receivers to determine location coordinates for the gas cylinder.

33. The system of claim 21, wherein the gas cylinder management application is further configured to determine the location of one gas cylinder of the plurality of gas cylinders based on triangulation of the at least one wireless signal including an identifier identifying the respective gas cylinder.

34. The method of claim 1, wherein the one or more wireless receivers include at least one wireless gateway receiver configured to detect a transfer of another gas cylinder through a gateway which provides an interface between at least two separate regions, and further comprising:

determining whether another wireless signal received by the at least one wireless gateway receiver indicates an intended transfer of the other gas cylinder according to transfer information retrieved from a database by using another identifier included in the other wireless signal; and upon determining that the transfer is not the intended transfer, generating an alert communicating that the other gas cylinder has been improperly transferred.

35. The method of claim 34, further comprising:

in response to detecting the transfer of the another gas cylinder through the gateway, storing transfer data describing the detected transfer in the database, wherein the transfer data includes a transfer time, an identifier for the gateway, and an identifier for the another gas cylinder.

36. The computer-readable storage medium of claim 12, wherein the one or more wireless receivers include at least one wireless gateway receiver configured to detect a transfer of another gas cylinder through a gateway which provides an interface between at least two separate regions, and wherein the process further comprises:

determining whether another wireless signal received by the at least one wireless gateway receiver indicates an intended transfer of the other gas cylinder according to transfer information retrieved from a database by using another identifier included in the other wireless signal; and upon determining that the transfer is not the intended transfer, generating an alert communicating that the other gas cylinder has been improperly transferred.

37. The system of claim 21, wherein the at least one wireless receiver includes one or more wireless gateway receivers configured to detect a transfer of a gas cylinder through a gateway, and wherein the gas cylinder management application is further configured to selectively generate alerts communicating an improper transfer of a gas cylinder.

* * * * *